United States Patent [19]

Johnson et al.

[11] Patent Number: 4,734,852
[45] Date of Patent: Mar. 29, 1988

[54] MECHANISM FOR PERFORMING DATA REFERENCES TO STORAGE IN PARALLEL WITH INSTRUCTION EXECUTION ON A REDUCED INSTRUCTION-SET PROCESSOR

[75] Inventors: William M. Johnson, San Jose; Rod G. Fleck, Mountain View; Cheng-Gang Kong, San Jose, all of Calif.; Ole Moller, Nivaa, Denmark

[73] Assignee: Advanced Micro Devices, Inc., Sunnyvale, Calif.

[21] Appl. No.: 771,435

[22] Filed: Aug. 30, 1985

[51] Int. Cl.[4] .............................................. G06F 12/00
[52] U.S. Cl. .................................................... 364/200
[58] Field of Search ... 364/200 MS File, 900 MS File; 371/10, 12, 13

[56] References Cited

U.S. PATENT DOCUMENTS

| | | | |
|---|---|---|---|
| 4,208,716 | 6/1980 | Porter et al. | 364/200 |
| 4,317,168 | 2/1982 | Messina et al. | 364/200 |
| 4,439,829 | 3/1984 | Tsiang et al. | 364/200 |

Primary Examiner—Thomas M. Heckler
Attorney, Agent, or Firm—Patrick T. King; Kenneth B. Salomon; J. Vincent Tortolano

[57] ABSTRACT

A simple architecture to implement a mechanism for performing data references to storage in parallel with instruction execution. The architecture is particularly suited to reduced instruction-set computers (RISCs) and employs a channel address register to store the main memory load or store address, a channel data register which temporarily stores the data from a store operation and, a channel control register which contains control information including the number of the register loaded within the file, in the case of a load operation. This number is used to detect instruction dependency of the data to be loaded. Logic circuitry suspends further instruction processing if the data required from a load is not yet available. A data-in register is used to store load data until an instruction execution cycle is available for writing it back to the register file. Logic circuitry detects storage of data prior to its writing back, so as to effectively replace the register file location. During page faults, the contents of the channel address, channel data, and channel control registers are saved to permit page fault recovery.

8 Claims, 3 Drawing Figures

MECHANISM FOR PERFORMING DATA REFERENCES TO STORAGE IN PARALLEL WITH INSTRUCTION EXECUTION ON A REDUCED INSTRUCTION-SET PROCESSOR

This invention relates to an instruction processor section of a digital computer, and more particularly, to method and apparatus permitting simultaneous storage access and instruction execution.

CROSS-REFERENCE TO RELATED, COPENDING APPLICATION

Related, copending application of particular interest to the instant application is U.S. application Ser. No. 771,311 entitled "General Purpose Register File Optimized for Intraprocedural Register Allocation, Procedure Calls, and Multitasking Performance", filed Aug. 30, 1985, on behalf of William M. Johnson, Brian W. Case, Rod Fleck, Ole Moller and Cheng Gang Kong and assigned to the assignee of the instant invention.

BACKGROUND OF THE INVENTION

Computers require significantly more time to execute an instruction which retrieves data from a main memory than to execute an instruction which makes no such storage reference. Storage references can markedly slow the performance of a computer. Accordingly, techniques for eliminating the time penalty for storage references are known to the art. One such technique is to execute instrutions simultaneously with the retrieval of data from memory. Precautions must be taken however to avoid errors caused by a so-called instruction dependency where execution of an instruction changes the contents of a memory location, but, before the change is effected, data is retrieved from that location for use by a subsequent instruction. In this case, the first instruction must be allowed to complete execution before retrieval of the data by the subsequent instruction.

Provision of simultaneous storage data references and instruction execution is particularly desirable in a reduced instruction-set computer (RISC) since one object of such computers is improved execution times. However, RISC's pose two problems for the application of prior art techniques such as mentioned above. First, a RISC usually includes a relatively large general purpose file register for the storage of often-used data. It is desirable to provide a separate data path from main memory into each register of the file so that data retrieved from storage may be written to any register within the file at the same time that data which results from the execution of an instruction is written to the file. Any delay in the writing is undesirable as it undermines the time improvement realized by the simultaneous data reference and instruction execution. The relatively large number of registers in a RISC file register makes the implementation of the separate data path uneconomical.

Secondly, RISC's omit the microcode level of procesor control. Since the availability of microcode programming is often used to handle memory page faults through an interrupt procedure, RISC's must provide alternatives in both hardware and the software at the instruction set level to meet demand paging requirements.

SUMMARY OF THE INVENTION

The instant invention provides a simple architecture to implement a mechanism for performing data references to storage in parallel with instruction execution. The architecture is particularly suited to RISC's and employs a channel address register to store the main memory load or store address, a channel data register which temporarily stores the data for a store operation and, a channel control register which contains control information including the number of the register loaded within the file, in the case of a load operation. This number is used to detect instruction dependency of the data to be loaded. Logic circuitry suspends further instruction processing if the data required from a load is not yet available.

A data-in register is used to store load data until an instruction execution cycle is available for writing it back to the register file. This technique eliminates the need for a separate path into the register file. Logic circuitry detects storage of data prior to its writing back, so as to effectively replace the register file location.

During page faults, the contents of the channel address, channel data, and channel control registers are saved to permit page fault recovery.

DETAILED DESCRIPTION OF THE PREFERRED EMBODIMENT

Figure 1:
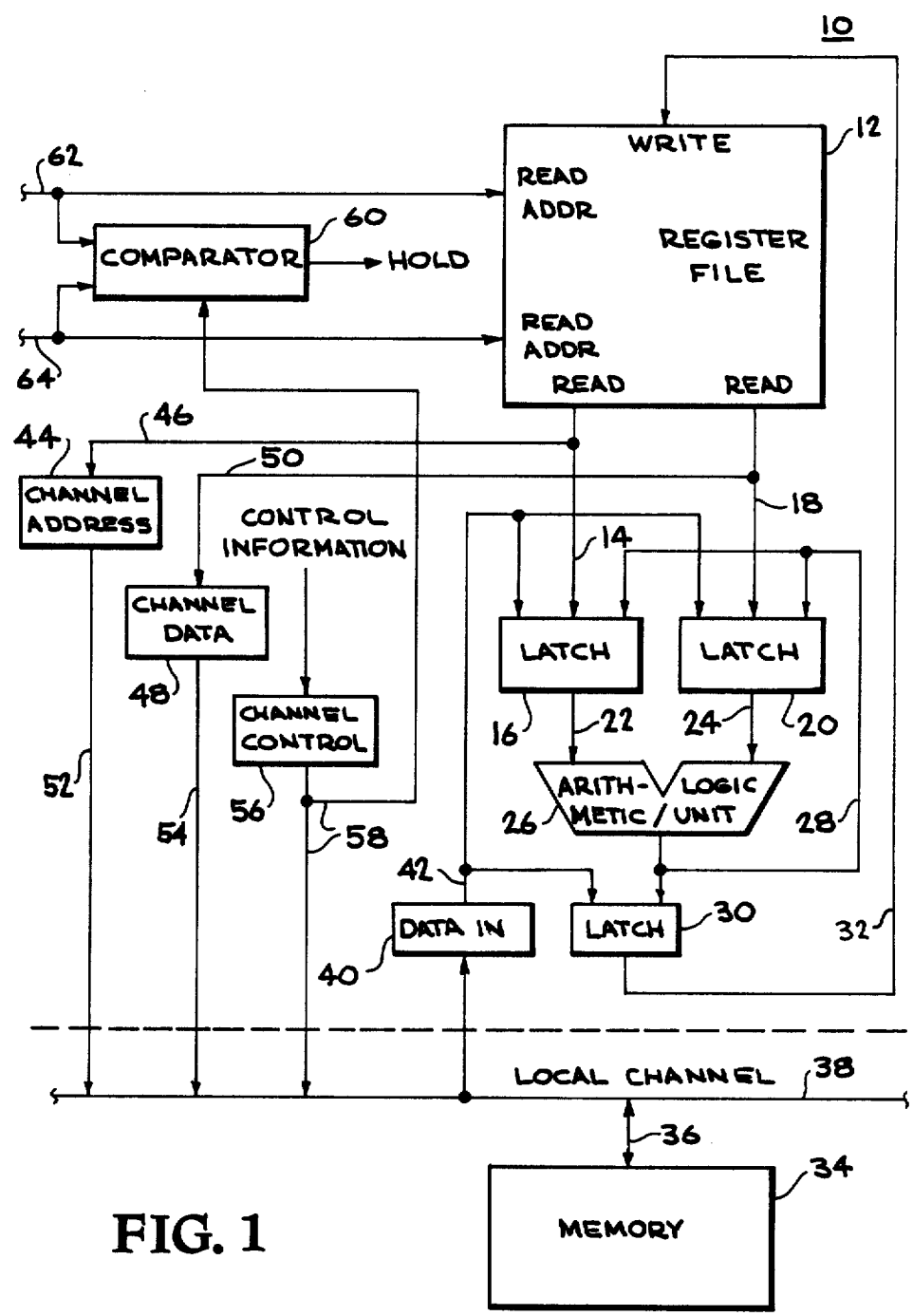
FIG. 1 is a block diagram of a portion of a RISC processor providing parallel data references and instruction execution.

The digital processor control portion 10 of a reduced instruction set computer (RISC) is shown in block diagram form in FIG. 1 which provides data references to storage simultaneously with instruction execution. Processor 10 includes a register file 12 which is intended for storage of often-used data. A register file suitable for use in processor 10 is described in related, copending U.S. application Ser. No. 771,311 entitled "General Purpose Register File Optimized for Intraprocedural Register Allocation, Procedure Calls, and Multiasking Performance", filed Aug. 30, 1985 on behalf of William M. Johnson, Brian W. Case, Rod Fleck, Ole Moller and Cheng Gang Kong and assigned to the assignee of the instant invention. That description is incorporated herein by reference. The paths shown in FIG. 1 illustrate only the data flow between the indicated elements and are capable of conducting several signals in parallel. Control signal paths are also required, as will be appreciated by those skilled in the art, but are not shown in FIG. 1 because it is well known by those skilled in the art how to effect control of the various illustrated elements.

Briefly, the register file 12 includes a set of registers each with a location designator or number. The register file 12 has a first and a second read port, a first and a second read address port, and a write port. The contents of a register within file 12 transferred to the first read port is conducted via a bus 14 to a data latch 16 and that transferred to the second read port is conducted via a bus 18 to a data latch 20. An output terminal of data latch 16, respectively, data latch 20, is connected via a bus 22, 24 respectively, to a first, second, respectively, input to an arithmetic/logic unit (ALU) 26. An output terminal of ALU 26 is connected to a second input terminal of latch 16 and latch 20 via a bus 28. Bus 28 also connects the output of ALU 26 to an input terminal of a data latch 30. An output terminal of latch 30 is connected via a bus 32 to the write port of register file 12.

A portion of processor 10, not shown in FIG. 1, processes instructions fetched from an instruction cache, not shown, and causes the execution of actions called for by the instructions. Such action may include the loading of one of the data latches 16 or 20 from a register in file 12. The address of the particular register is specified by the instruction. Alternatively, such action may be the storing of the results of an ALU 26 operation held in latch 30 into a register in file 12. Again, the address is specified by the instruction. These actions are controlled by a portion of the processor 10 not shown in FIG. 1, as will be appreciated by those skilled in the art. Reference can be had to the related, copending application for a detailed description of these operations.

A main memory 34 is used by the processor 10 to store less-frequently needed data. A bidirectional data bus 36 connects memory 34 to a local channel 38 which serves processor 10. Other processors, not shown, may share memory 34 with processor 10. If so, they would be connected to memory 34 via their own local channels.

An input terminal of a data-in register 40 is connected to local channel 38 so that load data retrieved from memory 34 can be temporarily stored. An output terminal of data-in register 40 is connected to an input terminal of latches 16, 20 and 30 via a bus 42.

An input terminal of a channel address register 44 is connected via a bus 46 to the first read port of register file 12 and an input terminal of a channel data register 48 is connected via a bus 50 to the second read port of register file 12. Output terminals of the channel address and channel data registers 44 and 48 are connected to the local channel 38 via busses 52 and 54, respectively. A channel control register 56 receives status and control signals from the control portion of processor 10 and generates signals via signal lines 58 which maintain communication between the elements connected to the local channel 38.

During the decode cycle of a load or a store instruction, the control portion of processor 10 generates signals which causes the storage address to be generated at the second read port of the register file 12, and data in the case of a store instruction, to be generated at the first read port of the register file 12 and at the end of the decode cycle, the address is conducted via bus 46 to channel address register 44, the data is conducted via bus 50 to channel data register 48, and control information is placed in the channel control register 56. The contents of registers 44, 48 and 56 are not changed until completion of the storage reference to memory 34, so that if a memory 34 page fault occurs before completion, the contents of these registers may be saved and used to restart the operation which caused the bus to detect a fault.

Normally, execution of an instruction by the ALU 26 and related portions of processor 10 can occur independently and simultaneously with transfer of data from the main memory 34 via data-in register 40 and to the main memory via channel address and data registers 44 and 48, under control of the channel control register 56 and the control portion of processor 10. However, the number of the register in file 12 stored in channel control register 56 is also used to detect an instruction "depending" on the data to be loaded which may preclude simultaneous data references to storage and instruction execution.

A comparator 60, shown in FIG. 1, receives on a first and a second signal line 62 and 64, signals representing, respectively, the register number of an operand to be retrieved from the file 12 and the register number of the register within file 12 which is the destination of an in-progress load, i.e., will be used to load the operand. Signals on lines 62 and 64 are also applied to the first and second read address ports, respectively, of register file 12. Comparator 60 also receives control signals from channel control 56 via signal lines 58 indicative of a register number within file 12 of any load which is in-progress. Comparator 60 generates at an output terminal a HIGH HOLD signal if the comparison of the register numbers conducted along lines 62 or 64 results in a match with that conducted along line 58, and further processing of the instruction retrieving the operand is suspended until the load in-progress is completed.

Figure 2:
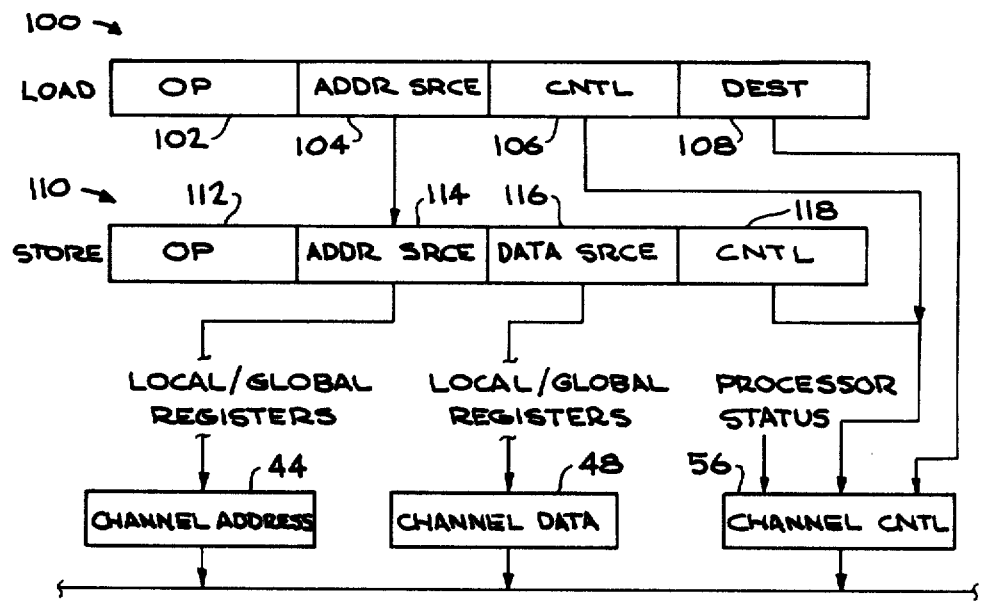
FIG. 2 illustrates the execution of load and store instructions by the processor of the instant invention.

Reference should now be had to FIG. 2, which illustrates the execution of storage reference instructions, for a better understanding of the operation of the processor 10 during loading and storage of data to main memory 34. A portion 100 of a load instruction is shown consisting of an operation code 102, a register location number 104 identifying a location within file 12 of a memory 34 source address, the control information 106, and a destination address within register file 12 108. As shown in FIG. 2, a source address is stored in the register within file 12 at a location identified by location number 104 for later transfer to the channel address register 44, the control information 106 and destination address 108 are stored in the channel control register 56 along with processor status information.

A portion 110 of a store instruction is shown in FIG. 2 consisting of an operation code 112, a register location number 114 identifying a location within file 12 of a memory 34 source address, the register location number of the source of data to be retrieved from register file 12 116 and the control information 118. A source address is stored in the register file 12 at location identified by location number 114 for later transfer to the channel address register 44, the data source is stored in the register file 12 at location identified by location number 116 for later transfer to the channel data register 48, and the control information 118 is stored in the channel control register 56. In this manner data can be loaded from main memory 34 to register file 12, and stored into main memory 34 from register file 12, simultaneously with instruction execution. Instruction dependencies are detected by the comparator 60 described above and prevent further execution of an instruction until a load is completed, if a dependency is detected. Alternatively, if a page fault is detected within main memory 34 the contents of the registers 44, 48 and 56 can be used to resolve and restart the faulting operation.

Referring again to FIG. 1, data retrieved from main memory 34 is conducted via bus 36 and local channel 38 to the data-in register 40 where it is stored until an instruction execution cycle is available in which the data may be written to the register file 12. As the size of the register file 12 precludes a separate data path for such operations, the operation and architecture of processor illustrated in FIG. 1 eliminates the need for such separate paths. While the data resides in the data-in register 40, the comparators which detect instruction dependencies, described above, control the source of this data for use by the ALU 26. During this period the contents of the data-in register 40 is conducted to either the first or second inputs of the ALU 26 via bus 42 and data latches 16 and 20, respectively, so that the data-in register 40 effectively replaces the register within file 12 which is the destination of the data retrieved from main memory 34.

Upon availability of an instruction execution cycle in which to write the contents of the data-in register 40 to register file 12, the contents of register 40 is conducted to latch 30 and therefrom to the write port of file 12 via bus 32.

An instruction following the one which caused the data-in register 40 to be used to temporarily store data retrieved from memory 34 will exist which will also require access of data from main memory 34. This subsequent instruction will also require temporary storage of data within data-in register 40. However, the existence of this subsequent instruction also guarantees the availability of a cycle in which to write to the register file 12, as will be described below, in connection with the timing diagram of FIG. 3.

Figure 3:
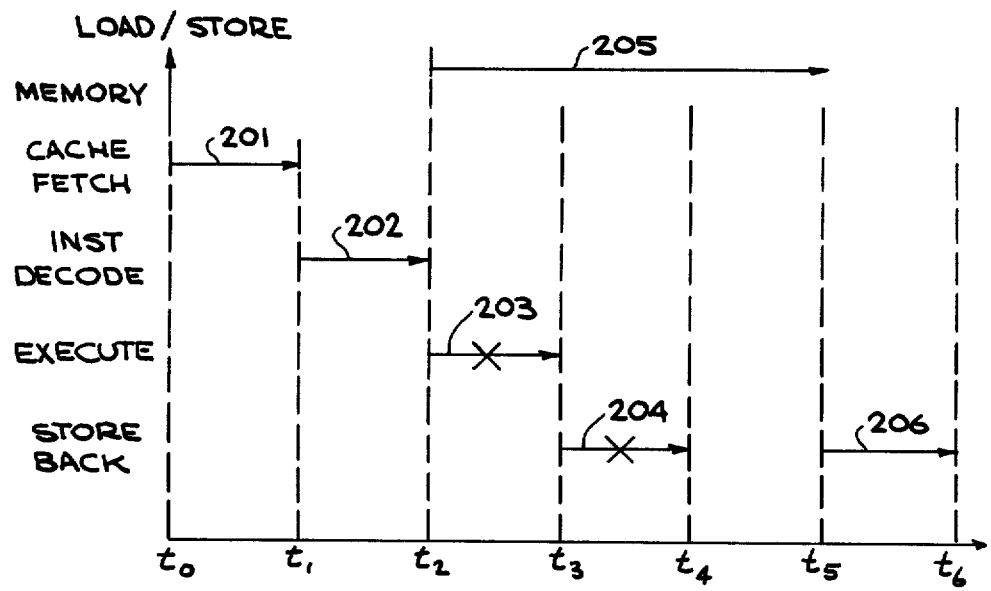
FIG. 3 is a timing diagram of the processor of the instant invention illustrating the simultaneous reference to data and instruction execution.

The processor 10 employs a four stage pipeline for the processing of instructions; fetch instruction from an instruction cache, decode instruction, execute the instruction, and store results. FIG. 3 is a timing diagram which illustrates simultaneous storage data references and execution of instructions provided by the processor 10 of the instant invention. Beginning at a time t0, an instruction fetch cycle 201 occurs, followed by an instruction decode cycle 202 beginning at t1, followed by an instruction execute cycle 203 beginning at t2, followed by a store back to file 12 operation 204 beginning at t3, and lasting until t4. The processor 10 can initiate transfers of data 205 from the register file 12 to the main memory 34 also beginning at time t2, so as to occur during the cycle immediately following the execution 203 fo an instruction, beginning at t3. The store back operation must occur after the main memory transfer operation 205 finishes, at time t5, thus a delayed store back operation 206 begins at t5 and continues until t6. Additionally, a transfer of data from main memory 34 to file 12 can occur during the period t5 to t6, simultaneous with the delayed store back operation 206.

We claim:

1. A digital processor control which cyclically executes instructions from a set including a load from memory and a store to memory instruction and provides instruction execution simultaneously with access to a memory, comprising:

file means having a first and a econd output terminal, a first and a second read address terminal, and an input terminal, for storing a plurality of plural-bit words, each storage location having a designator, said file means further for generating at said first and said second output terminals signals corresponding to said word stored in the location having a designator specified by said signals applied to said first and said second read address terminals, respectively;

first means having an output terminal, said first means connected to said memory for temporarily receiving and storing a word retrieved from said memory in response to execution of said load from memory instruction, and for generating at said output terminal signals corresponding to said word;

combining means having a plurality of input terminals connected to said file means output terminals and to said first means output terminal for arithmetically combining selectable ones of said signals applied at said input terminals and for generating signals corresponding to said combination;

second and third means connected to said file means first and second, respectively, output terminal for temporarily receiving and storing signals corresponding to a word generated thereat, said second and third means having an output terminal connected to said memory;

fourth means for temporarily receiving and storing control information and for generating channel control signals therefrom; and first latch multiplex means responsive to said signals generated by said combining means and by said first means for temporarily storing one of said signals for selectably conducting to said file means input terminal said one of said signals;

wherein said memory stores the contents of said third means in response to said contents of said second, and fourth means; and wherein said combining means selects said contents of said first means until said first latch multiplex means conducts and contents of said first means to said file means.

2. A digital processor control according to claim 1 wherein said combining means comprises:

arithmetic logic unit means having first and second input terminals and an output terminal for generating therefrom said signals corresponding to said combination;

second latch multiplex means responsive to said signals generated at the first output terminal of said file means, responsive to signals generated at said output terminal of said arithmetic logic unit means, and responsive to signals generated at said output terminal of said first means, for temporarily storing one of said signals and for selectably conducting said one of said signals to said first input terminal of said arithmetic logic unit; and third latch multiplex means responsive to said signals generated at the second output terminal of said file means, responsive to said signals generated at said output terminal of said arithmetic logic unit means, and responsive to signals generated at said output terminal of said first means, for temporarily storing one of said signals and for selectably conducting one of said signals to said second input terminal of said arithmetic logic unit.

3. A digital processor control according to claim 1 wherein said control information stored by said fourth means includes the file means location designator corresponding to the contents of said first means.

4. A digital processor control according to claim 1 wherein said channel control signals include an address portion, said digital processor control further including comparator means having a first and a second input terminal connected to said first and second read address terminals of said file means, respectively, responsive to said channel control signals for generating therefrom a first signal indicative of equality of at least one of said address signals applied to said first and second read address terminals of said file means with said address portion of said channel control signals, and a second signal otherwise.

5. A method of executing instructions by a digital processor which are retrieved from an instruction cache, each instruction including a plurality of operands, said instruction executed simultaneously with accesses to a memory, said digital processor having a digital processor control which has a file of registers each having a location designator, comprising the steps of:

(a) retrieving an instruction from said cache;
(b) determining the register file location designators of the operands of the instruction retrieved at step (a);
(c) storing the register file location designators of said operands determined at step (b) and
(d) executing said instruction retrieved at step (a) and sumultaneously retrieving data from memory at an address contained in a location designation within said register file unless one or more of said location designators stored at step (c) equal said location designator within said register file.

6. The method of executing instructions according to claim 5 further including the steps of:

(e) temporarily storing data retrieved from memory to be stored at a location designator within said register file; and
(f) executing said instruction retrieved at step (a) using the data at said location designators stored at step (c) unless one or more of said location designators equal said location designator defined at step (e) in which case using the data temporarily stored at step (e) for said one or more operands.

7. The method of executing instructions according to claim 6 further including the step of:

(g) repeating steps (e) and (f) until said data temporarily stored at step (e) is stored at said location designator within said register file.

8. A method of recovering from a memory page faulted by a digital processor which cyclically executes instructions each including a plurality of operands from a set including a load data instruction and a store data instruction, which has a memory having a plurality of memory locations each having an address and a file of registers each having a location designator, comprising the steps of:

(a) retrieving a said load or said store instruction from a cache;
(b) determining the memory addresses and the register file location designators of the operands of said instruction retrieved at step (a);
(c) for each memory access required by said instruction retrieved at step (a), temporarily storing said memory address determined at step (b) and, in the case of a store instruction retrieved at step (a) temporarily storing data to be stored by said store instruction; and in the case of a load instruction retrieved at step (a), temporarily storing said location designator determined at step (b); and
(d) for each memory access at step (c) which generates a memory page fault, restarting said memory access using said values stored at step (c).

* * * * *